United States Patent
Ohshima (10) Patent No.: US 8,794,534 B2
(45) Date of Patent: Aug. 5, 2014

(54) RFID TAG AND ELECTRONIC DEVICE EQUIPPED WITH RFID TAG

(75) Inventor: Atsushi Ohshima, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/404,604

(22) Filed: Feb. 24, 2012

(65) Prior Publication Data

US 2012/0223147 A1    Sep. 6, 2012

(30) Foreign Application Priority Data

Mar. 1, 2011    (JP) .................... 2011-044252

(51) Int. Cl.
*G06K 19/06*    (2006.01)

(52) U.S. Cl.
USPC .......................................... 235/492; 235/487

(58) Field of Classification Search
USPC ................................. 235/487, 492
See application file for complete search history.

(56) References Cited

U.S. PATENT DOCUMENTS

| | | | |
|---|---|---|---|
| 6,719,206 B1 * | 4/2004 | Bashan et al. | 235/492 |
| 7,501,947 B2 * | 3/2009 | Youn | 340/572.1 |
| 2002/0055822 A1 * | 5/2002 | Amadeo et al. | 702/38 |
| 2005/0280511 A1 * | 12/2005 | Yokoyama et al. | 340/10.5 |
| 2006/0232413 A1 * | 10/2006 | Lam et al. | 340/572.1 |
| 2006/0250250 A1 * | 11/2006 | Youn | 340/572.7 |

FOREIGN PATENT DOCUMENTS

| | | |
|---|---|---|
| JP | 2005-148632 | 6/2005 |
| JP | 2007-76068 | 3/2007 |

OTHER PUBLICATIONS

Machine-translation for JP 2005-148632, Yamagishi et al., Module and System for Transmitting and Receiving Equipment Characteristic Data, published Jun. 9, 2005.*

* cited by examiner

*Primary Examiner* — Paultep Savusdiphol
(74) *Attorney, Agent, or Firm* — Oblon, Spivak, McClelland, Maier & Neustadt, L.L.P.

(57) ABSTRACT

A radio frequency identification (RFID) tag is commonly used in wired communication and wireless communication. Wiring of an antenna for the wireless communication is also used for wiring in the wired communication, and the wiring of the antenna is isolated in the wired communication.

11 Claims, 6 Drawing Sheets

FIG.1

PRIOR ART

RFID TAG

FIG.9

RFID TAG

RFID TAG AND ELECTRONIC DEVICE EQUIPPED WITH RFID TAG

CROSS-REFERENCE TO RELATED APPLICATIONS

The present application claims priority to and incorporates by reference the entire contents of Japanese Patent Application No. 2011-044252 filed in Japan on Mar. 1, 2011.

BACKGROUND OF THE INVENTION

1. Field of the Invention

The present invention relates to a wired/wireless RFID tag and an electronic device equipped with the RFID tag.

2. Description of the Related Art

Recently, much attention has been paid to a radio frequency identification (RFID) tag having a function of recording the identification codes and other necessary information of products and components; the RFID wirelessly transmits and receives the information to and from a management system. For example, the RFID tag may be attached to a toner bottle or the like used in a copying machine or a printer to record a usage state as well as an identification code, and the information is confirmed by wireless communication at the time of collections and inspections, so that maintenance work, for example, can be improved. However, wireless communication performed while the RFID tag is operated in a device may cause unnecessary radiation and conflict with the Radio Law in some cases.

There has been known a technology to use a RFID tag commonly in wired communication and wireless communication; the RFID tag is wire-controlled in a device whereas information is wirelessly transmitted to and received from a management system when an attachment part of the RFID tag is detached from the device. However, terminals and wiring are clearly isolated for the wired communication and the wireless communication in the conventional wired/wireless RFID tag of this kind, and the shape and miniaturization of the tag are restricted due to the terminals and wiring for the wired communication.

Japanese Patent Application Laid-open No. 2005-148632 discloses an RFID tag in which wiring for the wired communication is drawn from a wireless antenna to be connected to a wired terminal, so that wired/wireless transmission and reception can be realized with a simple configuration. However, a signal for the wired communication between a apparatus main body and the RFID tag needs to be the same as an analog signal (RF signal) that is used for wireless communication, and a mechanism for converting the signal into an analog signal is required on the apparatus side. If a signal for the wired communication between the apparatus main body and the RFID tag is set to be a normal digital signal used on the apparatus side, a mechanism for converting a digital signal into an analog signal is required on the RFID tag side.

Therefore, there is a need to provide a wired/wireless RFID tag and an electronic device equipped with the RFID tag for which restrictions on the shape and miniaturization of the tag due to terminals and wiring for the wired communication can be eased.

There is also a need to provide a wired/wireless RFID tag and an electronic device equipped with the RFID tag with which a normal digital signal used in an apparatus can be used in the wired communication and an RF signal can be used in wireless communication.

SUMMARY OF THE INVENTION

It is an object of the present invention to at least partially solve the problems in the conventional technology.

A radio frequency identification (RFID) tag is commonly used in wired communication and wireless communication. Wiring of a wireless antenna for the wireless communication is also used for wiring in the wired communication, and the wiring of the wireless antenna is isolated in the wired communication.

An electronic device includes: a radio frequency identification (RFID) tag that is commonly used in wired communication and wireless communication and is mounted on the electronic device. Wiring of a wireless antenna for the wireless communication is also used in the wired communication for wiring, and the wiring of the wireless antenna is isolated in the wired communication.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
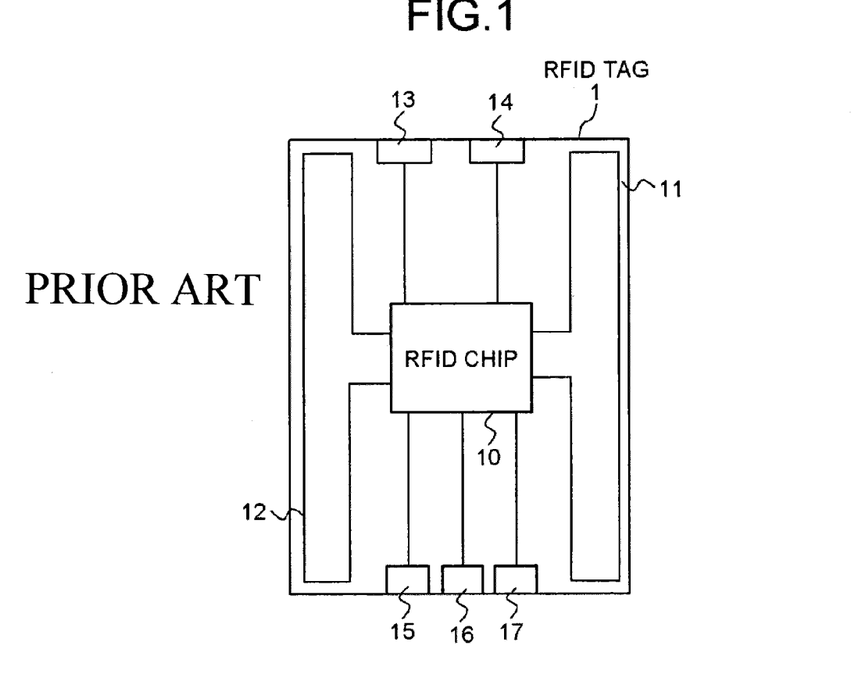
FIG. 1 is a diagram for illustrating a configuration example of a conventional wired/wireless RFID tag.

First, a conventional wired/wireless RFID tag will be described with reference to FIG. 1. In FIG. 1, the reference numeral 10 denotes an RFID chip that stores therein the identification code and other necessary information of a component to which the RFID tag 1 is attached. The reference numerals 11 and 12 denote wireless communication antennas; for example, a power supplying antenna 11 and a communication antenna 12. The wireless communication antennas are separately illustrated as the power supply antenna and the communication antenna in FIG. 1, but may be combined into one antenna. The reference numerals 13 and 14 denote wired power supply terminals, and 15, 16, and 17 denote wired communication terminals. While a three-wire system is presented in FIG. 1, a one-wire system as well as the three-wire system can be used; the only difference lies in the number of terminals.

In wired communication, the terminals 13, 14, 15, 16, and 17 of the RFID tag 1 are wire-connected to the apparatus side through cables or the like. At this time, the RFID chip 10 is operated by receiving the power supply (direct current) from the apparatus side through the terminals 13 and 14 of the RFID tag 1, and transmits and receives information to and from the apparatus side in the wired communication through the terminals 15, 16, and 17 of the RFID tag 1. In wireless communication, the electric power of radio waves from an external device such as a management system is received by the antenna 11 of the RFID tag 1, and is rectified in the RFID chip 10 to obtain direct-current power supply necessary for operating the RFID chip 10. Information is wirelessly transmitted and received between the RFID chip 10 and the external device such as a management system through the antenna 12 of the RFID tag 1.

As described above, the wireless components and the wired components are clearly isolated from each other in the configuration of FIG. 1. Thus, a normal digital signal used on the apparatus side can be used also in the wired communication, and the problems as in the case of the RFID tag described in Japanese Patent Application Laid-open No. 2005-148632 do not occur. However, the shape and miniaturization of the tag have been restricted due to the terminals and wiring for the wired communication.

The embodiments are characterized in that when the RFID is used in both the wired communication and the wireless communication, the wiring of a wireless antenna is also used as the wiring for the wired communication. In addition, the wireless antenna is allowed to function as a normal digital interface in the wired communication and to function as the wireless antenna in the wireless communication. The embodiments will be described hereinafter.

First Embodiment

Figure 2:
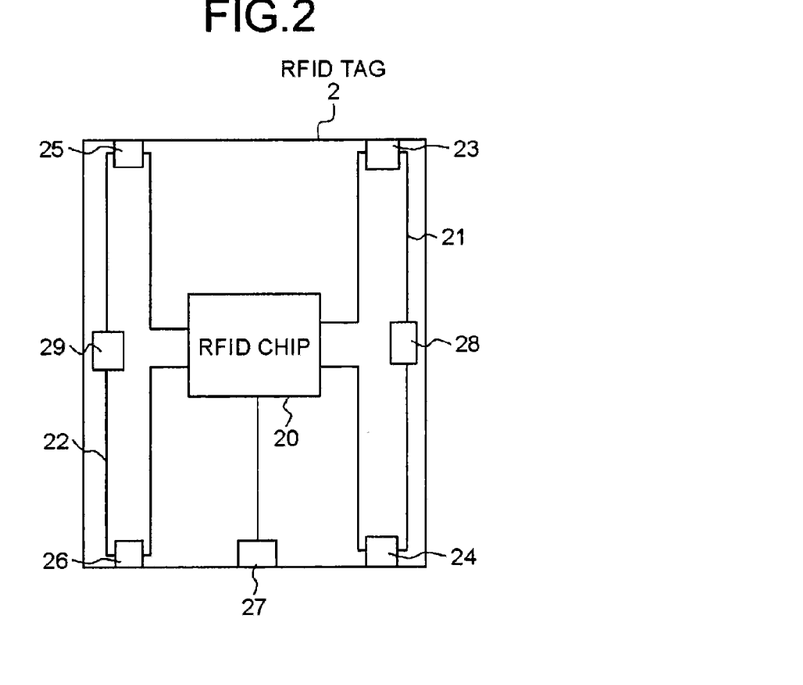
FIG. 2 is an overall configuration diagram of a wired/wireless RFID tag according to a first embodiment.

FIG. 2 is a configuration diagram of a wired/wireless RFID tag according to a first embodiment. In FIG. 2, an RFID tag 2 includes an RFID chip 20, a power supply antenna 21, a communication antenna 22, wired power supply terminals 23 and 24, wired communication terminals 25, 26, and 27, and high-frequency matching components 28 and 29. The wired power supply terminals 23 and 24 are arranged on the power supply antenna 21, and power supply wiring between the power supply terminals 23 and 24 and the RFID chip 20 is also used as wiring of the antenna 21. Furthermore, among the wired communication terminals 25, 26, and 27, the wired communication terminals 25 and 26 are arranged on the communication antenna 22, and wiring for wired communication between the wired communication terminals 25 and 26 and the RFID chip 20 is also used as wiring of the antenna 22. In this case, a short circuit occurs between the terminals 23 and 24 and between the terminals 25 and 26 in the wired communication. In order to prevent the short circuit, the high-frequency matching components 28 and 29 are provided on the antennas 21 and 22, respectively, to isolate lines. Specifically, the high-frequency matching components 28 and 29 function as isolation units that isolate the lines of the antennas (loop antennas) 21 and 22 in the wired communication.

Figure 3:
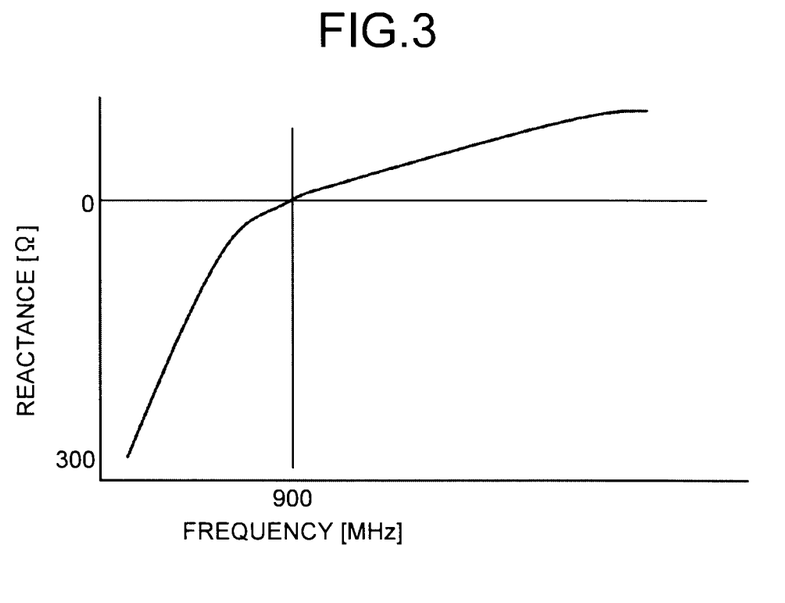
FIG. 3 is a diagram for illustrating an example of frequency characteristics of a high-frequency matching component.

For the high-frequency matching components 28 and 29, chip capacitors are used, for example. FIG. 3 illustrates an example of a characteristic of the high-frequency matching components 28 and 29. In this example, a frequency of 900 MHz is used in wireless communication by the RFID tag 2. Specifically, the reactance value of each of the high-frequency matching components 28 and 29 is about 0Ω at a frequency of 900 MHz. Thus, the high-frequency matching components 28 and 29 are turned on and the antennas 21 and 22 function as normal antennas. On the other hand, the reactance components of the high-frequency matching components 28 and 29 are increased at a frequency lower than 900 MHz. Thus, the high-frequency matching component 28 is turned off and the wiring of each of the antennas 21 and 22 is isolated. That is, the line between the terminal 23 and the RFID chip 20 and the line between the terminal 24 and the RFID chip 20 function as different lines in the antenna 21. Similarly, the line between the terminal 25 and the RFID chip 20 and the line between the terminal 26 and the RFID chip 20 function as different lines in the antenna 22.

With reference to FIG. 2 again, the terminals 23, 24, 25, 26, and 27 of the RFID tag 2 are wire-connected to the apparatus side through cables or the like in the wired communication. At this time, electric power is supplied from the apparatus side to the terminals 23 and 24. However, because the electric power is supplied as a direct current, the high-frequency matching component 28 is turned off. Thus, the terminals 23 and 24 are prevented from being short-circuited, and the direct-current electric power from the terminals 23 and 24 is directly transported to the RFID chip 20. Furthermore, information is transmitted and received between the RFID chip 20 and the apparatus side through the terminals 25, 26, and 27 in the wired communication. However, because a signal used in the wired communication is of a low frequency type in general (a normal digital signal used in the apparatus is used as it is), the high-frequency matching component 29 is turned off. Accordingly, the terminals 25 and 26 are prevented from being short-circuited, and information (digital signal) can be transmitted and received without any problems between the apparatus side and the RFID chip 20 in the wired communication using the terminals 25 and 26, and the terminal 27.

On the other hand, a high-frequency band of, for example, 900M Hz is used in the wireless communication. Thus, the high-frequency matching components 28 and 29 are turned on, and the antennas 21 and 22 function as normal antennas. Accordingly, the electric power of radio waves from an external device can be received by the antenna 21 to be supplied to the RFID chip 20. Furthermore, information can be wirelessly transmitted and received between the external device and the RFID chip 20 through the antenna 22.

Figure 4:
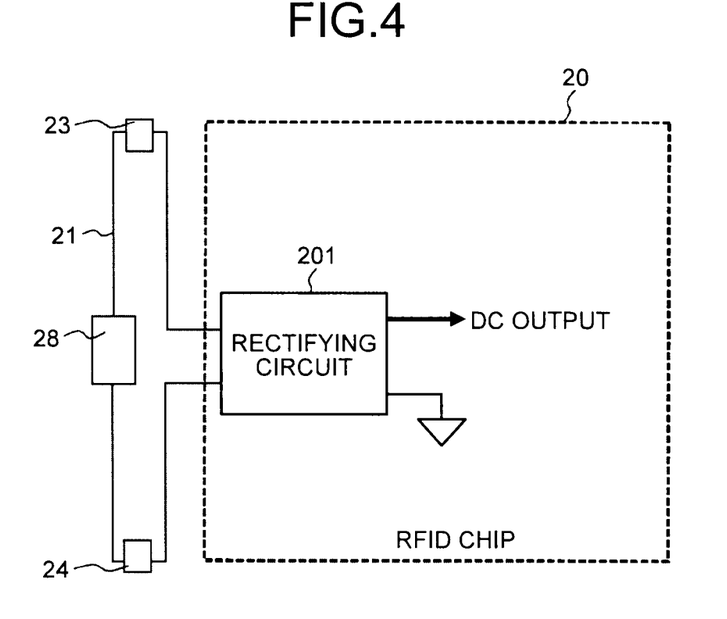
FIG. 4 is a diagram for illustrating a schematic configuration of a power supply system in the RFID chip of FIG. 2.

FIG. 4 illustrates a schematic configuration of the power supply antenna 21 and a power supply system in the RFID chip 20 according to the embodiment. In general, the RFID chip 20 includes a rectifying circuit 201 that extracts a direct-current component from a radio wave. Both ends of the power supply antenna 21 are directly connected to the rectifying circuit 201 in the RFID chip 20. In the wired communication, the terminals 23 and 24 on the power supply antenna 21 are connected to the apparatus side through cables or the like, through which electric power is supplied from the apparatus side to the terminals 23 and 24. The electric power from the apparatus side is a direct current and the frequency thereof is nearly 0 Hz. Thus, the antenna 21 is isolated by the high-frequency matching component 28. Accordingly, the direct-current electric power from the terminals 23 and 24 passes through the rectifying circuit 201 via the wiring of the antenna 21, and then is directly supplied to the RFID chip 20. In wireless communication, on the other hand, electric power from an external device, for example, is supplied to the RFID tag via a radio wave. Because the frequency of the radio wave is, for example, 900 MHz, the high-frequency matching component 28 is turned on, and the antenna 21 functions as a power supply antenna. Thus, the electric power of the radio wave from the external device is received by the antenna 21, rectified by the rectifying circuit 201, and supplied into the RFID chip 20.

Figure 5:
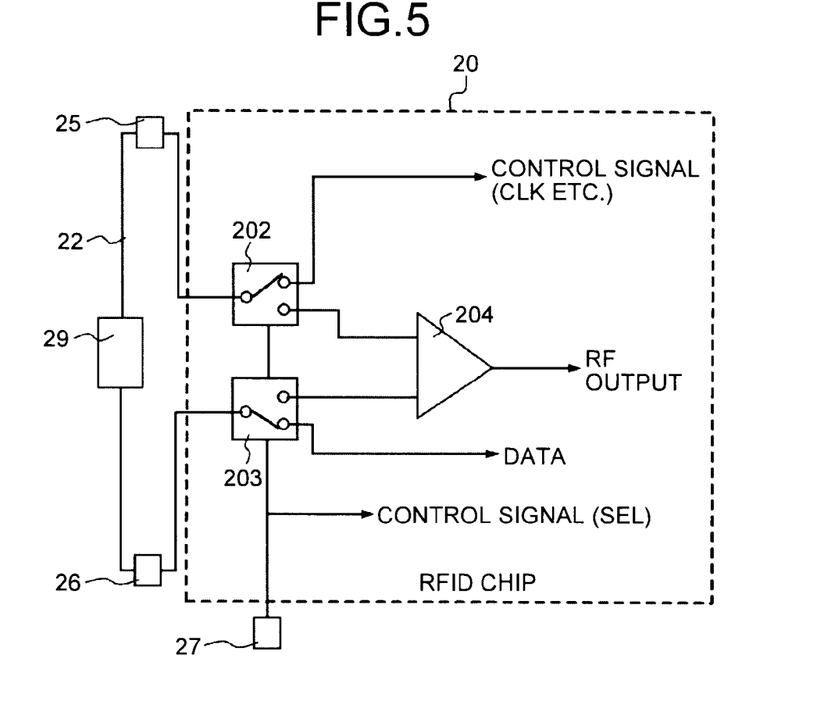
FIG. 5 is a diagram for illustrating a schematic configuration of a communicationystem in the RFID chip of FIG. 2.

FIG. 5 illustrates a schematic configuration of the communication antenna 22 and a communicationsystem in the RFID chip 20 according to the embodiment. The RFID chip 20 includes switch circuits 202 and 203, an amplifying circuit 204, and the like. The RFID chip 20 further includes a modulation/demodulation circuit and a digital circuit such as a central processing unit (CPU), a read-only memory (ROM), and a random access memory (RAM) (not illustrated in FIG. 5). Each end of the communication antenna 22 is connected to one of terminals of each of the switch circuits 202 and 203 in the RFID chip 20. Other terminals of the switch circuits 202 and 203 are usually connected to the amplifying circuit 204, but are isolated from the amplifying circuit 204 by a Select_Signal of the terminal 27, as illustrated in FIG. 5.

In the wired communication, the terminals 25 and 26 of the communication antenna 22 and the terminal 27 are connected to the apparatus side through cables or the like. In this embodiment, the terminal 26 is assumed as a data signal terminal, and the terminals 25 and 27 are assumed as control signal terminals. In the wired communication, the switch circuits 202 and 203 are turned off by a control signal (Select_Signal) from the terminal 27, and the amplifying circuit 204 is isolated. Furthermore, because a signal in the wired communication is a low frequency signal, the antenna 22 is isolated by the high-frequency matching component 29. Thus, a control signal (clock or the like) from the apparatus side enters the RFID chip 20 from the terminal 25, passes through the switch circuit 202, and is directly transported to the digital circuit. In addition, data from the apparatus side enters the RFID chip 20 from the terminal 26, passes through the switch circuit 203, and is directly transported to the digital circuit. Data from the digital circuit is transported to the apparatus side through a reverse path thereof.

A high-frequency band of, for example, 900 MHz is used in the wireless communication. Thus, the high-frequency matching component 29 is turned on, and the antenna 22 functions as a normal communication antenna. Furthermore, the switch circuits 202 and 203 are switched to a side of the amplifying circuit 204. Thus, a wireless signal from an external device is received by the antenna 22, and is output along a path through the switch circuits 202 and 203 and the amplifying circuit 204. An output signal (RF signal) from the amplifying circuit 204 is demodulated by a demodulation circuit, and a control signal and a data signal are isolated to be transported to the digital circuit. Although not illustrated in FIG. 5, in the case of transmission from the RFID chip 20 to the external device, an RF signal that includes data, a control signal, and the like is formed in a modulation circuit, and is transmitted from the antenna 22 to the external device through the switch circuits 202 and 203.

According to the embodiment, a normal digital signal can be used in the wired communication, and the RFID tag can be connected to the apparatus side in accordance with a normal wiring standard such as the Inter-Integrated Circuit (I2C). Thus, no special mechanisms are required on the RFID side or the apparatus side. Furthermore, the wiring for the wireless antenna is also used in the wired communication. Thus, restrictions on the shape and miniaturization of the tag can be eased as compared to the conventional wired/wireless RFID tag as illustrated in FIG. 1.

A general antenna is made of a conductive material such as copper foil. A conductive material with a sufficiently large thickness can be used as a wired terminal as it is by exposing the copper foil portion without providing a protective film on the antenna portion. Furthermore, when a large thickness or a large size is required for the terminal, the terminal portion can be easily formed by a conductive material by changing the size and the like of a portion that forms the terminal within a range where an antenna characteristic is not affected.

In FIG. 2, although the high-frequency matching components such as chip capacitors are used as units for isolating the lines of the wireless antenna in the wired communication, the high-frequency matching components may be replaced with mechanical switch components that are turned off when the RFID tag is attached to the apparatus and are turned on when the RFID tag is detached.

Second Embodiment

Figure 6:
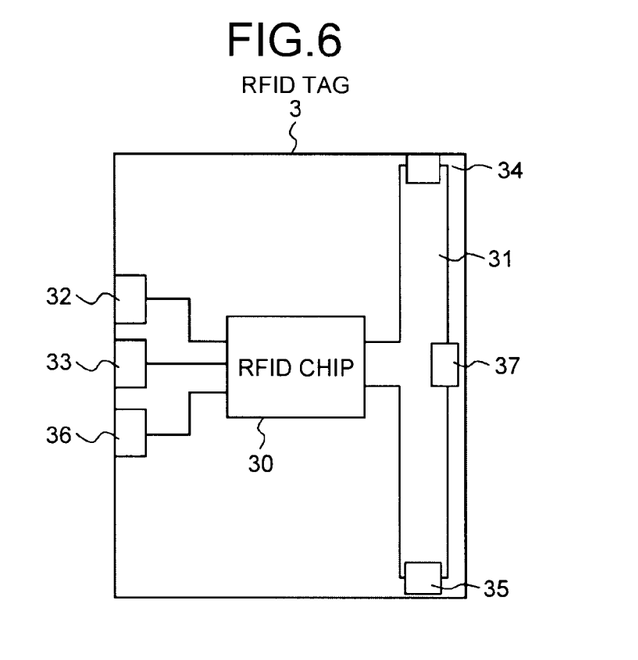
FIG. 6 is an overall configuration diagram of a wired/wireless RFID tag according to a second embodiment.

FIG. 6 is a configuration diagram of a wired/wireless RFID tag according to a second embodiment. The second embodiment illustrates an example in which one common antenna for power supply and communication is used for a wireless antenna.

In FIG. 6, an RFID tag 3 includes an RFID chip 30, a common antenna 31 for power supply and communication (loop antenna), wired power-supply terminals 32 and 33, wired communication terminals 34, 35, and 36, and a high-frequency matching component 37. Among the wired communication terminals 34, 35, and 36, the wired communication terminals 34 and 35 are provided on the common antenna 31, wiring for wired communication between the wired communication terminals 34 and 35 and the RFID chip 30 is also used as wiring of the common antenna 31. The function of the high-frequency matching component 37 is the same as that in the first embodiment.

In the wired communication, the wired power-supply terminals 32 and 33 and the wired communication terminals 34, 35, and 36 of the RFID tag 3 are connected to an apparatus side through cables or the like. At this time, direct-current electric power is supplied from the apparatus side to the wired power-supply terminals 32 and 33, and is directly transported to the RFID chip 30. Furthermore, the high-frequency matching component 37 is turned off in the wired communication. Thus, similarly to the first embodiment, information (digital signal) can be transmitted and received without any problem between the apparatus side and the RFID chip 30 in the wired communication using the wired communication terminals 34, 35, and 36.

On the other hand, the high-frequency matching component 37 is turned on in wireless communication, and the common antenna 31 for the power supply and the communication functions as a normal antenna. In this case, a radio wave from the external device is received by the common antenna 31 for power supply and communication and rectified in the RFID chip 30, so that the RFID chip 30 becomes operable. Furthermore, information is wirelessly transmitted and received between the external device and the RFID chip 30 through the common antenna 31 for power supply and communication.

Figure 7:
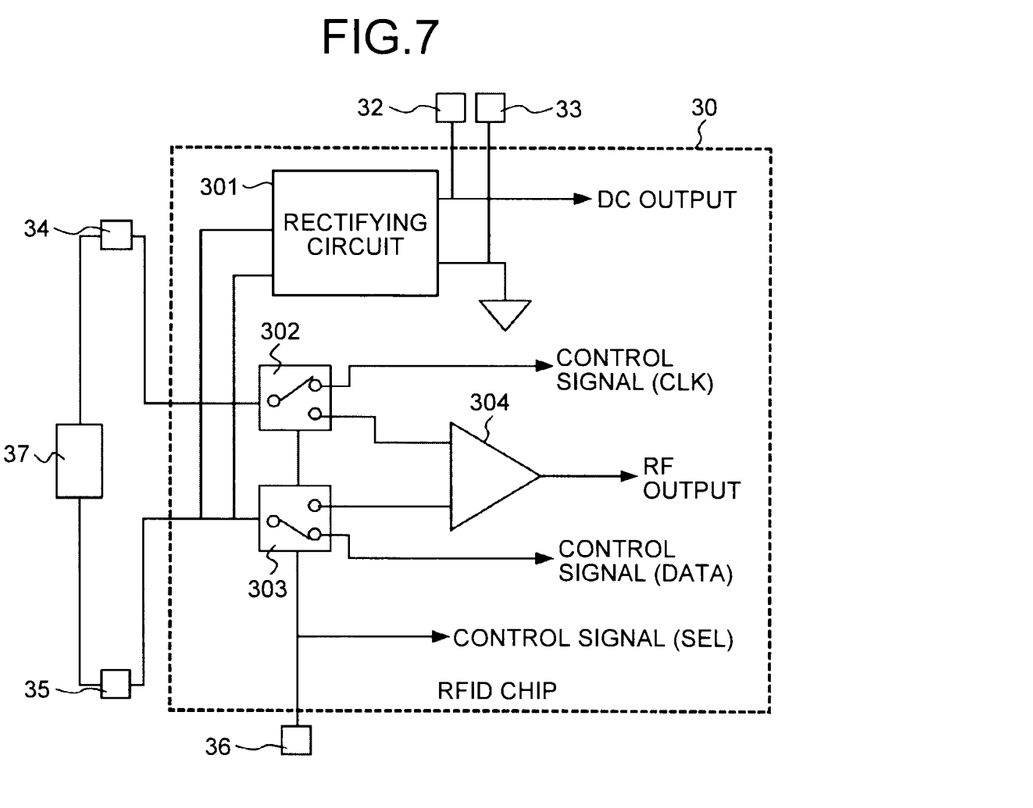
FIG. 7 is a diagram for illustrating a schematic configuration of a power supply/communicationystem in the RFID chip of FIG. 6.

FIG. 7 illustrates the common antenna 31 for the power supply and the communication and a schematic configuration of the RFID chip 30 according to the embodiment. Also in this case, the RFID chip 30 includes a rectifying circuit 301 that extracts a direct-current component from a radio wave. The wired power-supply terminals 32 and 33 are connected to an output side of the rectifying circuit 301. A configuration of the communicationsystem is the same as that of FIG. 5 in the first embodiment. Specifically, each end of the common antenna 31 for the power supply and the communication is connected to one of terminals of each of switch circuits 302 and 303 in the RFID chip 30. Other terminals of the switch circuits 302 and 303 are normally connected to an amplifying circuit 304, but are isolated from the amplifying circuit 304 by a Select_Signal of the terminal 36. A modulation/demodulation circuit, digital circuit, and the like are provided in the RFID chip 30, but are not illustrated in FIG. 7.

In the wired communication, the terminals 32 to 36 are connected to the apparatus through cables or the like. At this time, direct-current electric power is supplied from the apparatus side to the terminals 32 and 33, and is directly transported to the RFID chip 30. In the wired communication, the high-frequency matching component 37 is turned off. Furthermore, the switch circuits 302 and 303 are turned off by a control signal (Select_Signal) of the terminal 36, and the amplifying circuit 304 is isolated. Thus, a control signal (clock or the like) from the apparatus side enters the RFID chip 30 from the terminal 34, passes through the switch circuit 302, and is directly transported to the RFID chip 30. In addition, data from the apparatus side enters the RFID chip 30 from the terminal 35, passes through the switch circuit 303, and is directly transported to the RFID chip 30. Data from the RFID chip 30 is transported to the apparatus side on a reverse path thereof.

On the other hand, the high-frequency matching component 37 is turned on in the wireless communication, and functions as a common antenna for power supply and communication. Furthermore, the switch circuits 302 and 303 are switched to a side of the amplifying circuit 304. Thus, a radio wave from the external device is received by the common antenna 31 for the power supply and the communication, rectified by the rectifying circuit 301, and supplied into the RFID chip 30. Furthermore, an RF reception signal received by the common antenna 31 for power supply and communication is transported (RF output) to the RFID chip 30 along the path of the switch circuits 302 and 303 and the amplifying circuit 304. Similarly, an RF transmission signal from the RFID chip 30 passes through the switch circuits 302 and 303, and then is transmitted from the high-frequency matching component 37 that functions as the common antenna for power supply and communication to the external device.

Although the description has been given of the embodiment with the reference numerals 32 and 33 denoting the wired power supply terminals, the reference numerals 34 and 35 may be the wired power supply terminals, and 32, 33, and 36 may be the wired communication terminals instead. Furthermore, the high-frequency matching component 37 may be replaced with a switch component that is turned off mechanically when the RFID tag is attached to the apparatus body and is turned off when the RFID tag is detached therefrom.

As described above, the same effects as in the first embodiment can be obtained by using the wiring of the antenna for the power supply terminals or the communication terminals for the wired communication even in the RFID tag using a common antenna for power supply and communication.

Third Embodiment

Figure 8:
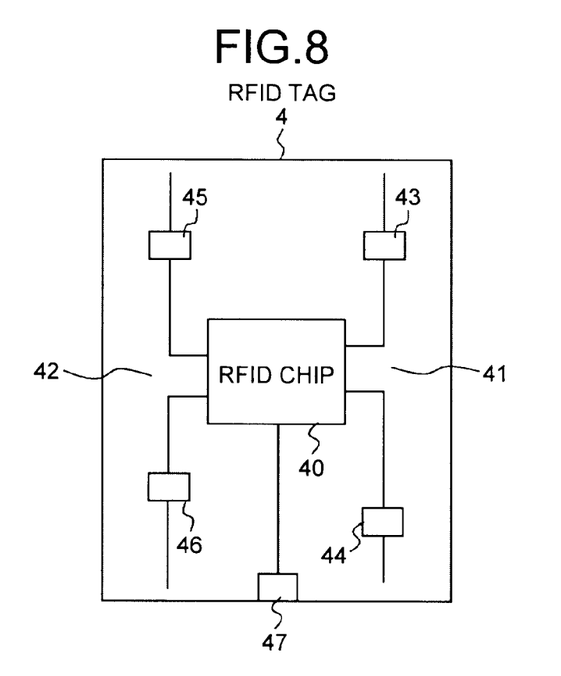
FIG. 8 is an overall configuration diagram of a wired/wireless RFID tag according to a third embodiment.

FIG. 8 is a configuration diagram of a commonly used wired/wireless RFID tag for wired/wireless communication according to a third embodiment. While the loop antennas have been used as the antennas in the first and second embodiments, the third embodiment employs a dipole antenna.

In FIG. 8, an RFID tag 4 includes an RFID chip 40, a power-supplying dipole antenna 41, a communication dipole antenna 42, wired power-supplying terminals 43 and 44, and wired communication terminals 45, 46, and 47. In FIG. 8, the wired power-supplying terminals 43 and 44 are provided on the power-supplying dipole antenna 41, and wiring for power supply between the power-supplying terminals 43 and 44 and the RFID chip 40 is also used as wiring of the power-supplying dipole antenna 41. Furthermore, among the wired communication terminals 45, 46, and 47, the wired communication terminals 45 and 46 are provided on the communication dipole antenna 42, and wiring for the wired communication between the wired communication terminals 45 and 46 and the RFID chip 40 is also used as wiring of the communication dipole antenna 42. The third embodiment requires no high-frequency matching component.

The configuration in the RFID chip 40 is the same as those of FIG. 4 and FIG. 5, and therefore, the illustration thereof is omitted.

While the dipole antennas are separately illustrated as the power supply dipole antenna and the communication dipole antenna in FIG. 8, similarly to the second embodiment, one dipole antenna can be used as a common antenna for the power supply and the communication. The configuration of the case is the same as those of FIG. 6 and FIG. 7. Thus, the illustration thereof is omitted.

The third embodiment requires no isolation unit such as the high-frequency matching components in the first and second embodiments. Thus, the configuration of the RFID tag can be further simplified.

Fourth Embodiment

Figure 9:
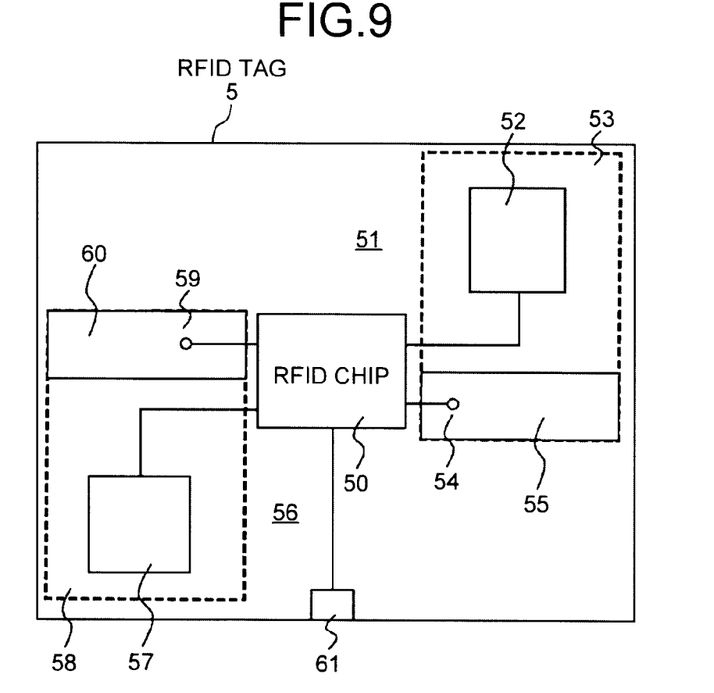
FIG. 9 is an overall configuration diagram of a wired/wireless RFID tag according to a fourth embodiment.

FIG. 9 is a configuration diagram of a commonly used RFID tag for wired and wireless communication according to a fourth embodiment. The fourth embodiment employs a planar patch antenna as an antenna.

In FIG. 9, an RFID tag 5 includes an RFID chip 50, a first power-supplying patch antenna 51, and a communication patch antenna 56. The first power-supplying patch antenna 51 includes a first front-face patch portion 52, a first rear-face patch portion 53, and a first ground terminal 55 connected to the first rear-face patch portion 53 through a first through hole 54. Similarly, a second communication patch antenna 56 includes a second front-face patch portion 57, a second rear-face patch portion 58, and a second ground terminal 60 connected to the second rear-face patch portion 58 through a second through hole 59. In FIG. 9, each patch portion is formed in a rectangular shape, but may be formed in a circular shape or any other shape.

The side length of the patch antenna is generally $\lambda/4$ to $\lambda/2$ with $\lambda$ being a wavelength of a radio wave for the wireless communication. Thus, the size for the wired terminal can be sufficiently secured and the patch portion can be used for the wired terminal.

In FIG. 9, the first front-face patch portion 52 and the second front-face patch portion 57 of the two patch antennas, i.e., the first power-supplying patch antenna 51 and the communication patch antenna 56 can be used as the wired terminals, and the wired communication can be performed using the first and second front-face patch portions 52 and 57 and a terminal 61. Wile no power supply terminals for the wired communication are provided in FIG. 9, a DC component as a DC offset is allowed to be contained in a digital signal to be transported from the apparatus side, and a signal component is isolated by a capacitance element, thereby capable of transporting electric power and signals through one wiring of the wired communication.

Fifth Embodiment

Figure 10:
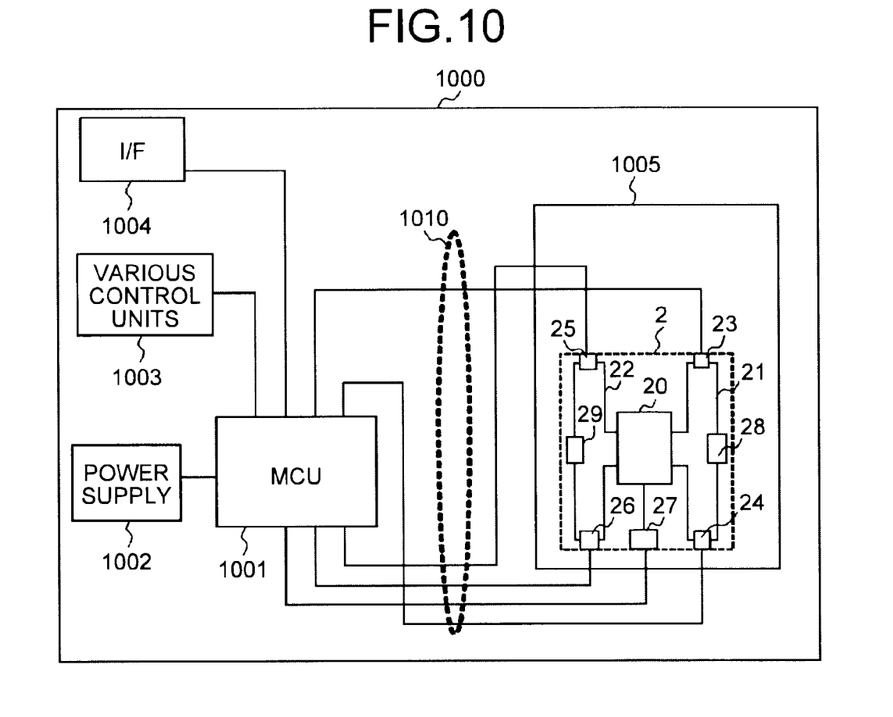
FIG. 10 is a diagram for illustrating a configuration example of an electronic device that includes the wired/wireless RFID tag of the embodiments.
Figure 11:
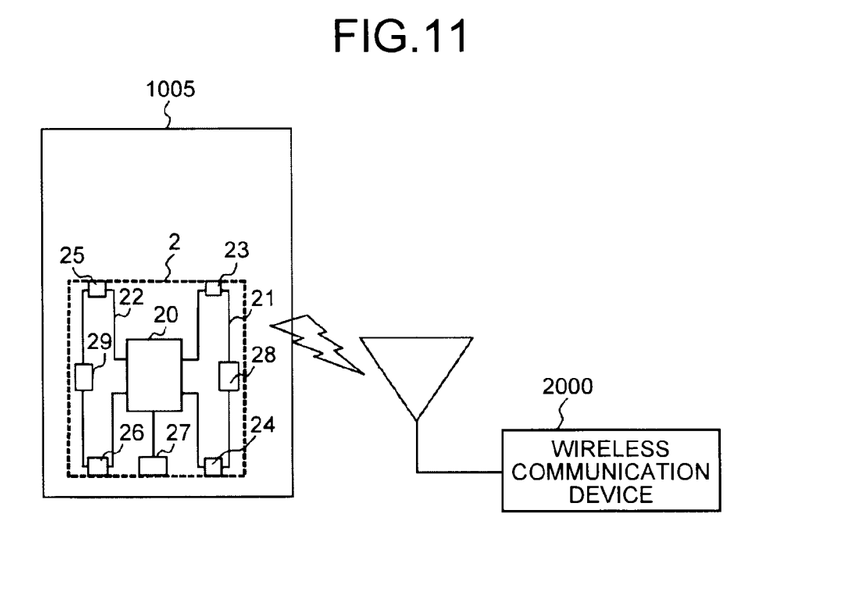
FIG. 11 is a diagram for illustrating a state in which a unit including the wired/wireless RFID tag of the embodiments is detached from the electronic device.

FIG. 10 and FIG. 11 illustrate an example of an electronic device equipped with a commonly used RFID tag for wired and wireless communication according to a fifth embodiment. In each of FIG. 10 and FIG. 11, the RFID tag 2 of the first embodiment is used. However, substantially the same applies to the use of any one of the RFID tags according to the second to fourth embodiments.

FIG. 10 illustrates a case in which the commonly used RFID tag 2 for the wired and wireless communication of the embodiment is mounted in an electronic device. In FIG. 10, the reference numeral 1000 denotes the main body of an electronic device that includes a microcomputer unit (MCU) 1001 serving as a main controller, a power supply 1002, various control units 1003, an interface unit (I/F) 1004 with communication networks and the like, and a detachable unit 1005.

The electronic device 1000 is, for example, a digital copying machine or MFP, and the detachable unit 1005 is a replacement unit such as a toner cartridge or a photosensitive element. It is obvious that the electronic device 1000 is not limited to a digital copying machine or MFP, but may be a printer, a facsimile machine, and the like.

The commonly used RFID tag 2 for the wired and wireless communication of the embodiment is attached to the detachable unit 1005. In the case where the unit 1005 is set in the electronic device 1000 for use, wired terminals 23 to 27 on the RFID tag 2 are connected to the MCU 1001 through a cable (harnesses or the like) 1010. In this case, direct-current electric power is supplied from the MCU 1001 through the cable 1010, and is transported to the RFID chip 20 using the wiring of the antenna 21. Furthermore, information is transmitted and received between the MCU 1001 and the RFID chip 20 along the path that connects the cables 1010 and the terminals 25, 26, and 27. In this case, the wiring of the antenna 22 is used between the terminals 25 and 26 and the RFID chip 20. In the wired communication, the high-frequency matching components 28 and 29 are turned off.

FIG. 11 illustrates a case in which the detachable unit 1005 is detached from the electronic device 1000. In this case, the high-frequency matching components 28 and 29 are turned on and the antennas 21 and 22 function as normal antennas in the RFID tag 2.

In FIG. 11, the reference numeral 2000 denotes a wireless communication device as an external device that functions as a part of a configuration such as a management system. The electric power of a radio wave transmitted from the wireless communication device 2000 is received by the antenna 21 of the RFID tag 2 and transported to the RFID chip 20, thereby to generate direct-current power supply in the RFID chip 20. Thus, the RFID chip 20 becomes operable. Information is wirelessly transmitted and received between the wireless communication device 2000 and the RFID chip 20 using the antenna 22.

As a wireless antenna, any one of a loop antenna, a dipole antenna, and a planar patch antenna may be used. In the case where the loop antenna is used, an isolation unit to isolate the path of the loop antenna in the wired communication is provided on the loop antenna. Neither the dipole antenna nor the planar patch antenna requires such an isolation unit.

With the wired/wireless RFID tag of the embodiment, the wiring of the wireless antenna is also used for the wired communication, so that restrictions on the shape and miniaturization of the tag can be eased. The wiring of the wireless antenna is isolated in the wired communication. Thus, common parts can be clearly isolated at the time of wireless communication and the wired communication, so that a normal digital signal used in an apparatus can be used in the wired communication and an analog signal (RF signal) can be used in wireless communication.

By using the electronic device equipped with the wired/wireless RFID tag of the embodiments, it is not necessary to provide an interface mechanism or the like on the apparatus side for converting a digital signal into an analog signal (RF signal).

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A radio frequency identification (RFID) tag for both wired communication and wireless communication, comprising:
    an antenna;
    a terminal for the wired communication provided on the antenna; and
    a controller connected to the antenna that switches a communication path through which a signal flows, the signal being received either at the antenna or at the terminal,
    wherein, for the wireless communication, the signal is received at the antenna and the controller sends the signal received at the antenna to an amplifying circuit that amplifies the signal, and
    wherein, for the wired communication, the signal is received at the terminal, the antenna is used as a communication path through which the signal received at the terminal flows, and the controller controls the amplifying circuit such that the amplifying circuit is cut off from the communication path.

2. The RFID tag according to claim 1, wherein
    the antenna includes a first antenna for power supply and a second antenna for communication,
    first wiring of the first antenna is used as second wiring in wired power supply, and
    third wiring of the second antenna is used as fourth wiring in the wired communication.

3. The RFID tag according to claim 1, wherein
    the antenna is formed by a common antenna for power supply and communication, and
    wiring of the common antenna is used as one of wiring for power supply used in the wired communication and another wiring used in the wired communication.

4. The RFID tag according to claim 1, wherein the antenna for the wireless communication is a loop antenna.

5. The RFID tag according to claim 4, further comprising:
    isolation circuitry provided on the loop antenna that isolates a path of the loop antenna in the wired communication.

6. The RFID tag according to claim 5, wherein the isolation unit circuitry is a high-frequency matching component that shows reactance of about 0 at a high frequency and an increased value thereof at a low frequency.

7. The RFID tag according to claim 5, wherein the isolation circuitry is a mechanical switch that is turned off when the RFID tag is mounted on a device and is turned on when the RFID tag is unmounted therefrom.

8. The RFID tag according to claim 1, wherein the antenna is a dipole antenna.

9. The RFID tag according to claim 1, wherein the antenna is a planar patch antenna.

10. The RFID tag according to claim 9, wherein a patch portion of the planar patch antenna is used as a wired terminal.

11. An electronic device, comprising:

a radio frequency identification (RFID) tag for both wired communication and wireless communication mounted on the electronic device;

an antenna;

a terminal for the wired communication provided on the antenna; and control circuitry connected to the antenna that switches a communication path through which a signal flows, the signal being received either at the antenna or at the terminal, wherein, for the wireless communication, the signal is received at the antenna and the control circuitry sends the signal received at the antenna to an amplifying circuit that amplifies the signal, and wherein, for the wired communication, the signal is received at the terminal, the antenna is used as a communication path through which the signal received at the terminal flows, and the control circuitry controls the amplifying circuit such that the amplifying circuit is cut off from the communication path.

* * * * *